United States Patent
Stone et al.

(10) Patent No.: US 7,531,917 B2
(45) Date of Patent: May 12, 2009

(54) MOBILE POWER SUPPLY

(75) Inventors: Todd Stone, Paris (CA); Anthony Cutrona, Vaughan (CA)

(73) Assignee: PowerCart Systems, Inc., Mississauga, Ontario (CA)

( * ) Notice: Subject to any disclaimer, the term of this patent is extended or adjusted under 35 U.S.C. 154(b) by 0 days.

(21) Appl. No.: 11/430,828

(22) Filed: May 10, 2006

(65) Prior Publication Data

US 2007/0262641 A1    Nov. 15, 2007

(51) Int. Cl.
*H02J 9/00* (2006.01)
(52) U.S. Cl. ........................................... 307/64
(58) Field of Classification Search .................... 307/64
See application file for complete search history.

(56) References Cited

U.S. PATENT DOCUMENTS

| | | | | |
|---|---|---|---|---|
| 4,134,091 A | * | 1/1979 | Rogers | 336/61 |
| 4,860,185 A | * | 8/1989 | Brewer et al. | 363/41 |
| 5,801,937 A | * | 9/1998 | Gold et al. | 363/141 |
| 5,920,177 A | * | 7/1999 | Davis | 320/114 |
| 6,038,156 A | * | 3/2000 | Inam et al. | 363/133 |
| 7,034,414 B1 | * | 4/2006 | Foerg et al. | 307/150 |
| 2002/0153865 A1 | * | 10/2002 | Nelson et al. | 320/152 |

FOREIGN PATENT DOCUMENTS

JP    2001-352664    * 12/2001

* cited by examiner

*Primary Examiner*—Robert L. DeBeradinis
(74) *Attorney, Agent, or Firm*—Shoemaker and Mattare

(57) ABSTRACT

A power supply system suitable for use in a mobile cart for providing power to peripheral devices. The power supply system includes a combination inverter and transformer connected between an AC input and a battery terminal for providing electrical current to peripheral devices. A charger is connected between the AC input and the battery terminal for charging a battery and a cooling device is located for removing heat from both the combination inverter and transformer and the charger.

16 Claims, 2 Drawing Sheets

MOBILE POWER SUPPLY

FIELD OF THE INVENTION

The present invention relates to mobile power supplies for use with, for example, wheeled carts such as patient point of care carts in health care facilities, for providing portable power for various applications.

BACKGROUND OF THE INVENTION

Wheeled carts including mobile power supplies are increasingly being used in various applications including retail applications for mobile, temporary or portable checkout locations, warehousing applications for barcode reading, barcode labeling, radio frequency identification (RFID) tag labeling and reading, and inventory tracking, and health care applications for carrying and powering patient care equipment such as monitors, pumps, ventilators or computers for tracking patient related data.

With this increase in popularity, there is also an increase in the demand for improvements in wheeled carts including mobile power supplies. In particular, there is a demand for increased reliability, increased ergonomic design and reduced size and weight.

Referring in particular to the health care environment, an uninterrupted supply of power to devices such as monitoring equipment including computers for tracking patient related data is often important, even when moving a patient from one location to another. Thus, a point of care cart including a battery power supply is used and transported with the patient and associated equipment. With the numerous pieces of equipment that may be employed, the size of the equipment and constraints of small patient care facilities, maneuverability, size and design of the point of care carts is important.

SUMMARY OF THE INVENTION

According to one aspect of an embodiment, there is provided a power supply system suitable for use in a mobile cart for providing power to peripheral devices. The power supply system includes a combination inverter and transformer connected between an AC input and a battery terminal for providing electrical current to peripheral devices. A charger is connected between the AC input and the battery terminal for charging a battery and a cooling device is located for removing heat from both the combination inverter and transformer and the charger.

According to another aspect of an embodiment, there is provided, a mobile cart including a body, a plurality of wheels connected to and supporting the body for rolling the body across a surface, and a power supply system connected to the body for providing power to peripheral devices. The power supply system includes an AC input, a combination inverter and transformer connected between the AC input and a battery terminal for providing electrical current to peripheral devices, a charger connected between the AC input and the battery terminal for charging a battery, a cooling device located for removing heat from both the combination inverter and transformer and the charger, and a peripheral output for connection of the peripheral devices.

Advantageously, the heat sink is located for removing heat from both the combination inverter and isolation transformer and the charger. Thus, rather than having separate heat sinks and fans, a single heat sink and fan are used to cool the combination inverter and isolation transformer and the charger. This results in reduced size and weight of the mobile power supply. Also, the combination of the isolation transformer and the power inverter into a single unit results in further reduction in size and weight.

In one particular embodiment, a single electronic controller is provided for an over-voltage control relay and a shunt for diverting current from the charger to the battery. Further, an extension box and a communications connection are included in the electronic controller for providing information relating to the mobile power supply and the battery, to a computer for monitoring, for example, battery state, as described in U.S. patent application Ser. No. 11/359,760, entitled System and Method for Monitoring Battery State, assigned to the assignee of the present application, the entire contents of which are incorporated herein by reference.

BRIEF DESCRIPTION OF THE DRAWINGS

Embodiments of the present application will now be described, by way of example only, with reference to the attached Figures, wherein.

DETAILED DESCRIPTION OF THE PREFERRED EMBODIMENT

Figure 1:
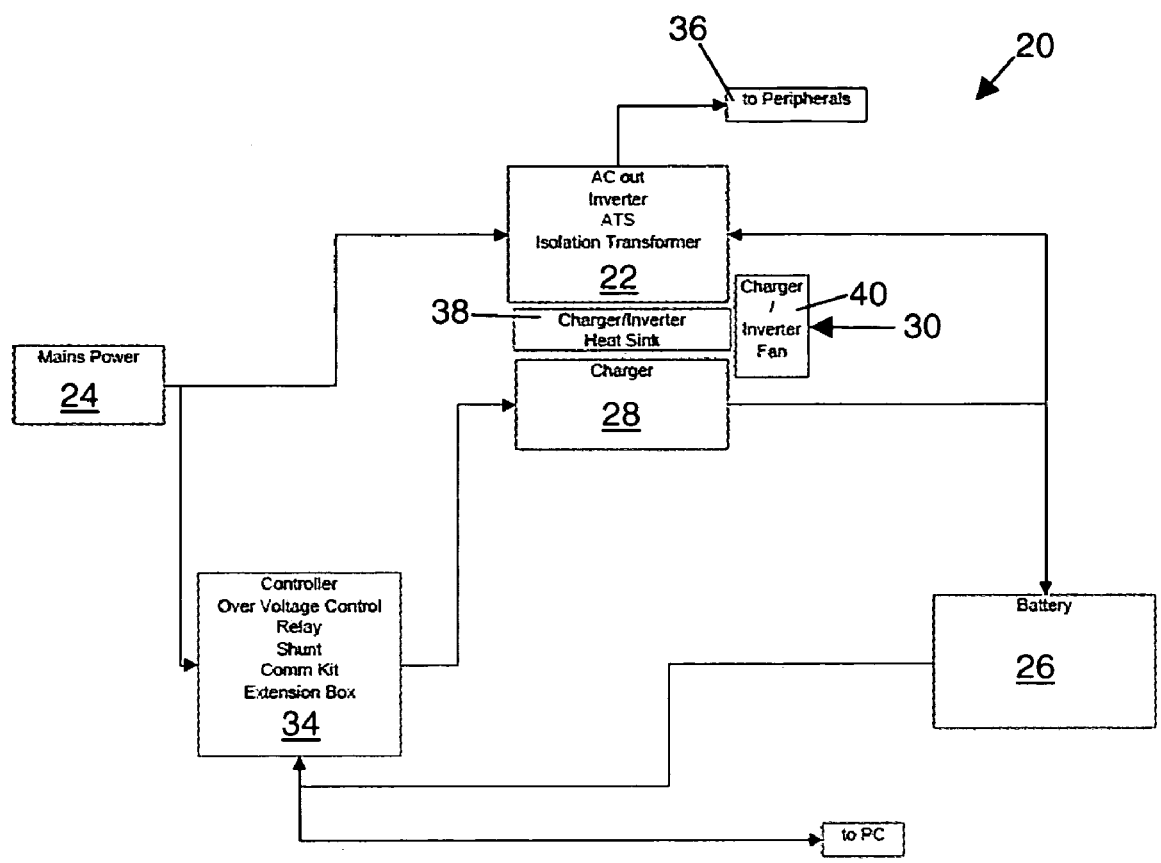
FIG. 1 is a schematic representation of a mobile power supply according to one embodiment of the present invention.

Referring first to FIG. 1, a power supply system for use in a mobile cart for providing power to peripheral devices is indicated generally by the numeral 20. The power supply system 20 includes a combined inverter/transformer 22 connected between an AC input 24 and a battery terminal for providing electrical current to peripheral devices. In the present application, peripheral devices include, for example, any device that is located on the mobile cart, attached to the mobile cart or powered by the power supply system. A charger 28 is connected between the AC input 24 and the battery terminal for charging a battery 26 and a cooling device 30 is located for removing heat from both the inverter 22 and the charger 28.

Referring still to FIG. 1, the power supply system 20 will be further described. The power supply system 20 includes a power converter portion and a control board 34. The power converter portion includes the AC input 24, the battery 26, the combined inverter/transformer 22, the charger 28 and the cooling device 30.

The control board 34 in the present embodiment is in the form of a printed circuit board (PCB) and has mounted thereon an over-voltage control relay, a Hall-effect sensor, a communication connection and miniature MOSFET for controlling the over-voltage control relay. The PCB further includes a number of terminals for connection of various ones of the components of the power supply system 20.

The AC input 24 is in the form of a plug for plugging into a wall socket for providing alternating current to the power supply system 20. From the AC input 24, power is split into two lines. One line goes to a peripheral output 36 through the combined inverter/transformer 22. The other line goes through the control board 34 to the charger 28 and then to the battery 26. The inverter/transformer 22 is also connected to the battery 26.

As indicated above, the control board 34 is connected between the charger 28 and the AC input 24. The control board 34 is also connected to the battery 26 and provides an output for connection of, for example, a computing device.

The inverter/transformer 22 is a dual winding transformer for performing several functions including, providing dielectric strength and inhibiting AC leakage by acting as an isolation transformer for electrically isolating the AC input. The inverter/transformer also draws DC (current) from the battery 26, converts to AC and provides AC out to the peripheral output 36 when current is drawn by a peripheral device and the AC input is not plugged into an operating wall socket. Further, the inverter/transformer 22 acts as an automatic transfer switch (ATS) for switching to provide output from the AC input 24 or from the battery 26 (via the inverter 22) depending on whether or not the AC input 24 is plugged into a wall socket. Thus, when plugged into an operating wall socket and receiving current therefrom, the current delivered to the peripheral output 36 comes from the AC input 24. When not plugged into an operating wall socket, the current comes from the battery 26 (via the inverter/transformer 22). Therefore, current is not drawn from the battery 26 by the inverter/transformer 22 during charging of the battery 26 and current is drawn from the battery 26 when current is not supplied at the AC input 24. It will now be appreciated that the inverter/transformer 22 performs all the functions of an isolation transformer, an inverter and an automatic transfer switch (ATS).

As indicated above, the AC input 24 is connected through the control board 34, to the charger 28. The over-voltage control relay on the control board 34 cuts off power to the charger if a fault is detected in the charger. This over-voltage control relay reduces the chance of venting or gassing of hydrogen from the battery 26 resulting from too high voltage or current on the battery 26.

The charger 28 converts AC to DC for charging the battery 26. It will be appreciated that the charger and the inverter/transformer 22 generate heat. In particular, heat is generated at power MOSFETS in both the charger 28 and the inverter/transformer. The cooling device 30 includes a heat sink 38 that is located between the inverter/transformer 22 and the charger 28 and wraps around the sides of the charger 28 to receive heat from both the charger 28 and from the inverter/transformer when in use. The heat sink 38 includes fins to aid in transferring heat away from the inverter/transformer 22 and from the charger 28 and partially wraps around the charger 28 as indicated above, to provide sufficient metallic mass for effective transfer of heat. The cooling device 30 also includes a fan 40 for heat transfer away from the heat sink 38.

The Hall-effect sensor on the control board 34 provides an analog output that is proportional to the magnetic field coming from a line passing through an aperture within the sensor. The Hall-effect sensor is connected to the battery for measuring electrical current.

The control board 34 also includes a controller including a microcomputer for receiving data, storage of data and for performing calculations relating to the state of the battery. The battery data includes, for example, the electrical current, measured using the Hall-effect sensor and the voltage. The calculations performed by the controller include, for example, the calculations described in co-pending Canadian and United States patent applications entitled System and Method for Monitoring Battery State, filed Feb. 23, 2006 and assigned to the assignee of the present application, the entire contents of which are incorporated herein by reference. As indicated, the current is measured using the Hall-effect sensor. As well, the open circuit voltage $V_{oc}$ of the battery is measured using a voltage divider in order to determine a measured state of charge ($SOC_m$). The controller is operable to calculate a calculated state of charge ($SOC_c$) based on the state of charge of the battery 26 prior to at least one use and the calculated discharge of the battery 26 during the at least one use. The controller also determines the state of health of the battery 26 based at least in part on the difference between the calculated state of charge and the measured state of charge. The controller is also operable to receive measurements and send signals to generate an alarm warning of a low battery voltage condition, for example, or to generate a notification of end of charge of the battery 26, for example. The operation and programming of a suitable controller is well within the grasp of one skilled in the art.

The communications connection includes a USB port on the control board 34 that provides output to external computing devices from the controller for monitoring usage and state of the battery 26.

It will now be appreciated that the control board 34, provides several functions on a single PCB board. For example, separate over-voltage control relays, shunts, communication kits and extension boxes for switching the over-voltage control relay are not necessary. Further, the control board 34 provides terminals on the PCB rather than separate terminal blocks. Thus, smaller devices are used on a single PCB. Further, the control board 34 provides for a controller that permits the storage of values and calculations for use in determining battery state of health as described in co-pending Canadian and United States patent applications entitled System and Method for Monitoring Battery State, filed Feb. 23, 2006 and assigned to the assignee of the present application.

Figure 2:
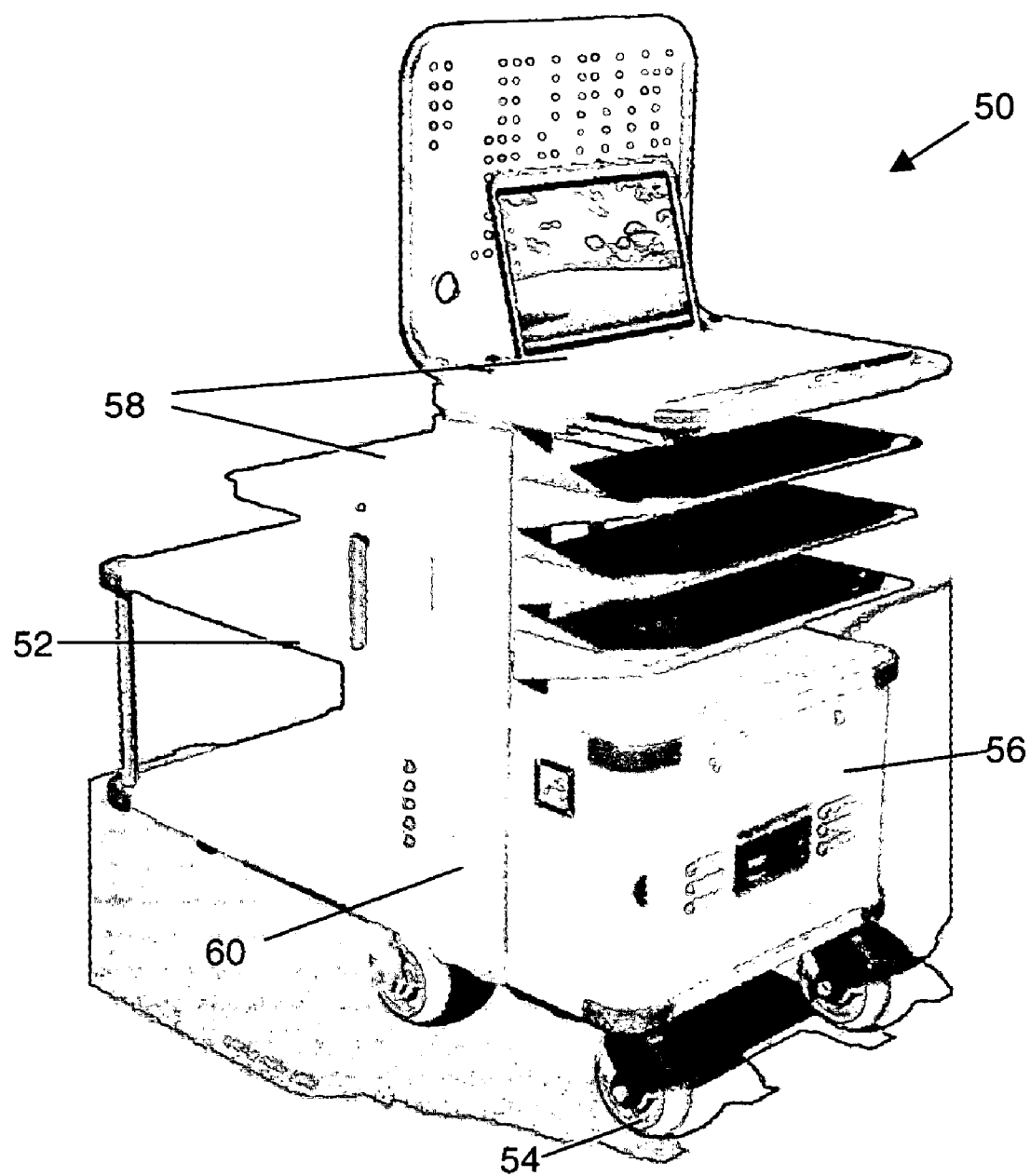
FIG. 2 is a perspective view of a mobile cart for use with a mobile power supply of FIG. 1.

Referring now to FIG. 2, a mobile cart is shown and indicated generally by the numeral 50. The mobile cart 50 includes a body 52 to which wheels 54 are attached for rolling the cart 50 along a surface. The power supply system 20 is included in a lower housing portion 56 of the body 52 for providing a supply of power to peripheral devices such as a computer. The power supply system 20 of the present embodiment is similar to that described above and therefore need not be further described herein. In the present embodiment, the cart body 52 includes working surfaces 58 for receiving devices, such as a keyboard and other suitable devices. The working surfaces 58 are connected to the lower housing portion 56 by legs 60 that are adjustable for adjusting the height of the working surfaces.

It will be appreciated that, although embodiments of the invention have been described and illustrated in detail, various modifications and changes may be made. While one embodiment is described above, some of the features described above can be replaced or even omitted. For example, the over-voltage control relay can be omitted. Also, the measurements received by the controller, the calculations performed and the alarm and notification signal conditions are provided for exemplary purposes and can vary. Still further alternatives and modifications may occur to those skilled in the art. All such alternatives and modifications are believed to be within the scope of the invention as defined by the claims appended hereto.

What is claimed is:

1. A power supply system suitable for use in a mobile cart for providing power to peripheral devices, the power supply system comprising:

a combination inverter and transformer connected between an AC input and a battery terminal for providing electrical current to peripheral devices;

a charger connected between said AC input and said battery terminal for charging a battery; and a cooling device located for removing heat from both said combination inverter and transformer and said charger, wherein said cooling device comprises a heat sink located between said combination inverter and transformer and said charger, and wherein said heat sink partially wraps around said charger.

2. The power supply system according to claim 1, wherein said cooling device further comprises a fan.

3. The power supply system according to claim 1, wherein said combination inverter transformer comprises a combination inverter, isolation transformer and automatic transfer switch for providing alternating current to said peripheral devices from one of said battery and alternating current supplied to said AC input based on whether or not alternating current is supplied to said AC input.

4. The power supply system according to claim 1, further comprising an over-voltage relay connected between said AC input and said charger and connected to said battery terminal.

5. The power supply system according to claim 1, further comprising a control board connected to said battery terminal, said AC input and said charger, said control board for measuring at least one electrical characteristic of said battery and performing at least one calculation using the measured electrical characteristic.

6. The power supply system according to claim 5, wherein said control board includes a Hall-effect sensor for measuring current from said battery.

7. The power supply system according to claim 5, wherein said control board includes a controller for performing said at least one calculation and for storage of data.

8. The power supply system according to claim 5, wherein said control board includes a plurality of terminals for connection.

9. The power supply system according to claim 5, wherein said control board comprises a controller, a Hall-effect sensor, an over-voltage control relay, a miniature MOSFET for switching said over-voltage control relay, a communication connection and connection terminals.

10. The power supply system according to claim 1, further comprising the battery.

11. A mobile cart comprising:
a body;
a plurality of wheels connected to and supporting said body for rolling said body across a surface; and
a power supply system connected to said body for providing power to peripheral devices, the power supply system comprising:
an AC input;
a combination inverter and transformer connected between said AC input and a battery terminal for providing electrical current to peripheral devices;
a charger connected between said AC input and said battery terminal for charging a battery;
a cooling device located for removing heat from both said combination inverter and transformer and said charger, wherein said cooling device comprises a heat sink located between said combination inverter and transformer and said charger and said heat sink partially wraps around said charger; and
a peripheral output for connection of said peripheral devices.

12. The mobile cart according to claim 11, wherein said cooling device further comprises a fan.

13. The mobile cart according to claim 11, wherein said combination inverter and transformer comprises a combination inverter, isolation transformer and automatic transfer switch for providing alternating current to said peripheral devices from one of said battery and alternating current supplied to said AC input based on whether or not alternating current is supplied to said AC input.

14. The mobile cart according to claim 11, further comprising an over-voltage relay connected between said AC input and said charger and connected to said battery terminal.

15. The mobile cart according to claim 11, further comprising a control board connected to said battery terminal, said AC input and said charger, said control board for measuring at least one electrical characteristic of said battery and performing at least one calculation using the measured electrical characteristic.

16. The mobile cart according to claim 11, further comprising said battery.

* * * * *